Patented Sept. 22, 1931

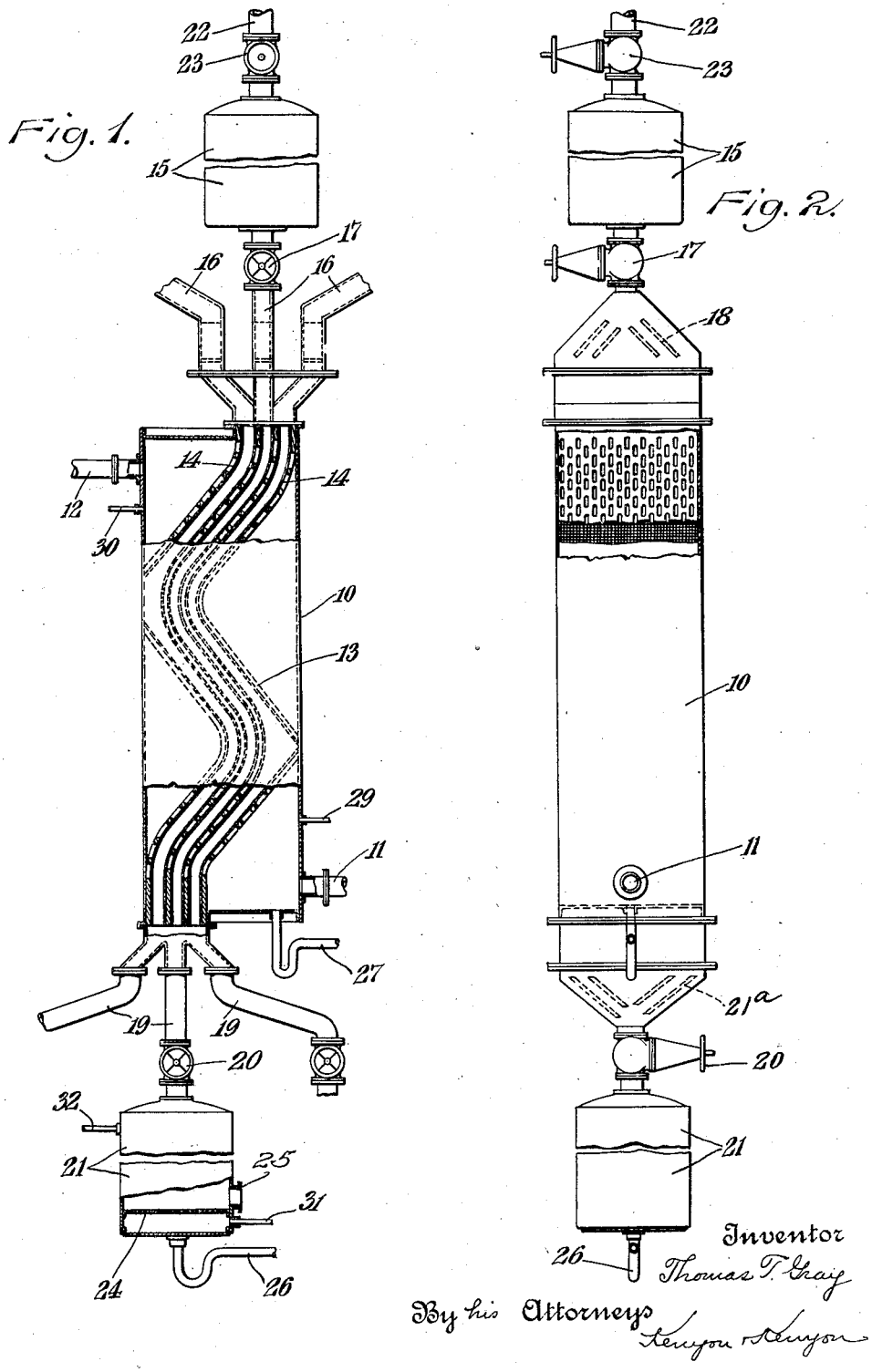

1,823,895

UNITED STATES PATENT OFFICE

THOMAS T. GRAY, OF ELIZABETH, NEW JERSEY, ASSIGNOR TO GRAY PROCESSES CORPORATION, OF NEWARK, NEW JERSEY, A CORPORATION OF DELAWARE

APPARATUS FOR CONTACTING VAPORS WITH SOLIDS

Application filed August 28, 1926. Serial No. 132,055.

This invention relates to treatment of petroleum hydrocarbons and more especially to an apparatus for contacting hydrocarbon vapors with a powdered treating material.

In applicant's Patent No. 1,340,889 of May 25th, 1920, there is disclosed the treatment of hydrocarbons which comprises passing them in vapor form through treating material contained in a tower. After a period of operation, the treating material becomes inactive and has to be replaced or revived. This necessitates discontinuing the operation of the apparatus until fresh treating material can be introduced.

An object of this invention is progressively to replace spent treating material with fresh treating material so that the operation of the apparatus may be continuous.

According to this invention, a zigzag channel is provided in a treating tower. At least two sides of the channel are made pervious to vapors and impervious to pulverized solids. The treating material in powdered form is caused to flow downwardly through the channel and vapor to be treated is supplied to the tower and caused to traverse the channel, thereby coming into contact with the treating material. The pitch of the channel is such that the treating material moves along slowly by gravity. The length of the channel and the rate of supply of vapor to the tower are so related that the treating material reaches the lower end of the channel in an exhausted condition.

Such an apparatus permits contacting the vapor with a single treating material or with a mixture of several different materials. It is often desirable to contact the vapor separately with more than one treating material. In such instances, the apparatus may be provided with a plurality of channels in which different treating materials may be caused to flow. The channels will be arranged adjacent each other so that they will have common walls. Such apparatus may be used to treat vapors separately with one or more different materials, with a single material, or with a mixture of different materials, as a single material or mixture may be passed through one channel without the others being used.

The treating material is supplied to the channel from suitable hoppers and it is discharged from the channel into other hoppers. The supply and discharge hoppers are sealed so that it is impossible for the vapor to escape from the channel therethrough. The vapor may be brought into contact with the treating material either at atmospheric or superatmospheric pressure as desired, the hoppers and tower being of sufficient strength to withstand the pressure used.

Other objects, novel features and advantages of this invention will be apparent from the following specification and accompanying drawings wherein Fig. 1 is a front elevation, partly in section, of a treating tower embodying the invention; and Fig. 2 is a side elevation thereof, partially in section.

The tank 10 is preferably of rectangular cross-section and has a vapor inlet pipe 11 and a vapor outlet pipe 12 communicating therewith at its bottom and top respectively. Extending between opposite walls of the tank 10 and fastened thereto in any suitable manner are plates 13 which form with the walls of the tank 10 zigzag channels extending from the top of the tower to the bottom thereof. These plates are perforated except for a short distance at their lower ends and fine mesh screens 14 are arranged on each face thereof. Each of the channels is connected with a hopper 15 through a conduit 16 controlled by a gate valve 17. In each conduit is provided a plurality of downwardly diverging baffle plates or spreaders 18. The lower ends of the channels are connected through conduits 19 controlled by valves 20 with discharge hoppers 21. In each discharge conduit are provided downwardly converging baffle plates or concentrator 21a.

The hoppers 15 are provided with filling pipes 22 controlled by valves 23. Near the bottom of the hopper 21 is provided a screen 24 of very fine mesh and just above the screen is a manhole 25 which is closed by a suitable cover so that the hopper 21 is vapor tight. A trapped pipe 26 leads from the bottom of the hopper 21 and a trapped pipe 27 leads from the bottom of the tower 10. A layer of insulating material may be provided on the exterior of the tower, if desired, to prevent heat losses by radiation. Pipes 29 and 30 are provided for passing steam through the treating tower, if desired. Also steam pipes 31 and 32 are provided whereby the clay in the tank 21 may be washed of any gummy deposits. In treating vapors with this apparatus the vapors are supplied to the bottom of the tower through the pipe 11 and discharged from the top of the tower through the pipe 12. As the plates 13 extend across the full width of the tower, it is necessary for the vapors in rising from the inlet 11 to the outlet 12 to pass through the perforations in the plates 13 and thus traverse the channels. Treating material is supplied to the various channels from the respective hoppers by opening the valves 17. The treating material is spread out the full width of the channels by means of the spreaders 18 so that the distribution of treating material in the channel is uniform. The screens 14 prevent the treating material dropping through the perforations in the plates 13 while permitting free flow of the vapors to be treated. The rising vapor is thus caused to come in contact with the descending stream of treating material. The pitch of the plates and the supply of the vapor to be treated are so related that by the time the treating material has reached the bottom of its channel, its activity has become exhausted. The baffle plates 22 concentrate the treating material uniformly in the discharge conduits and maintain uniform flow of the treating material through the channels.

Although the apparatus has been disclosed as having more than one channel, it is apparent that a single channel apparatus is within the scope of the invention. An apparatus having the one channel can be used only to treat vapor with a single material or with a mixture of different materials; whereas an apparatus having a plurality of channels may be used to treat vapor separately with a number of different materials or mixtures. Moreover, if it is desired to treat vapor with a single material or a mixture, this can be done by using but one channel.

Any liquid condensed from the vapor in the tower 10 and collecting in the bottom of the tower is drained out through the pipe 27 and may be refluxed into the still (not shown) for further distillation. Any liquid which may be formed in the treating material is carried down with the treating material into the hopper 21. The liquid drains through the screen 24 which is pervious to liquids but impervious to solids and is removed therefrom through the pipe 26 to be made use of as desired.

This apparatus may be used for bringing the vapor into contact with the treating material either at atmospheric or super-atmospheric pressure. Vapor is prevented from escaping through the hoppers by the valve 23 and the cover for the manhole 25. The tower channels and hoppers are built sufficiently sturdy that they will withstand the pressure at which the vapor is contacted with the treating material. It is apparent that if desired the treating tower may be made cylindrical in form, the better to withstand the pressure. Additional treating material may be introduced into the hopper 15 if desired by connecting with the pipe 22 a reserve vapor-tight hopper and permitting the flow of treating material from the reserve hopper into the hopper 15 or in any other manner well known in the art to prevent escape of the vapor.

The pitch of the channel is such that the treating material will flow therethrough by gravity at a comparatively slow rate and the rate of supply of vapor to the tower is so adjusted that the treating material has reached the end of its useful life by the time it reaches the lower end of the channel. A sufficient supply of active material is always presented for contact with the vapor so that the refining operation may continue without interruption.

The treating material used depends upon the treatment to which it is desired to subject the vapor. If it is desired to polymerize unstable, unsaturated hydrocarbons contained in cracked distillate, the material may be some adsorptive catalyst such as fuller's earth, bauxite, montomorillonite, bentonite, Death Valley clay, silica gel or the like. If it is desired to remove contaminating sulphur compounds, the treating material may be a metallic oxide, such, for example, as copper oxide. If it is desired both to polymerize and remove the sulphur compounds, a mixture of these materials may be used or each treating material may be passed through a separate channel so that the vapor is subjected to them separately.

In the apparatus herein disclosed, the vapor inlet has been shown at the bottom of the tower and the vapor outlet at the top of the tower, thus causing the vapor to ascend in its passage through the tower. It is of course apparent that the position of the inlet and outlet might be reversed to cause the vapor to descend in its passage through the tower without in any way departing from the spirit of the invention.

What I claim as new and desire to secure by Letters Patent of the United States is:

1. In an apparatus for contacting vapor with solid treating materials, a closed treating vessel having a vapor inlet and outlet, a conduit extending through said vessel and having walls pervious to vapors but impervious to said solid treating material and vapor tight hoppers for supplying active treating material to said conduit and receiving spent treating material therefrom.

2. In an apparatus for contacting vapor with solid treating materials, a closed treating vessel having a vapor inlet and outlet, a plurality of conduits extending through said vessel and having walls pervious to vapors and impervious to the solid treating materials and vapor tight hoppers individual to each conduit for supplying active treating material thereto and receiving spent treating material therefrom.

In testimony whereof, I have signed my name to this specification.

THOMAS T. GRAY.